United States Patent Office 3,017,354
Patented Jan. 16, 1962

3,017,354
OIL WELL INHIBITOR
Olen L. Riggs, Jr., Ponca City, Okla., assignor to Continental Oil Company, Ponca City, Okla., a corporation of Delaware
No Drawing. Filed Dec. 17, 1956, Ser. No. 628,539
13 Claims. (Cl. 252—8.55)

This invention relates to the prevention of corrosion of metal equipment in producing oil wells. More particularly, the invention relates to the protection of steel casings, steel tubing, and other metal well equipment from the deleterious effects of fluids containing dissolved gases.

In the production of oil, corrosion of steel and other metal well equipment is caused by the action of aqueous carbonic acid and/or water soluble aliphatic acids (i.e. such as acetic and propionic acids) and natural brines. Efforts have been made in the past to reduce the cost of replacing corroded equipment by the introduction of alkaline materials such as sodium hydroxide into the well to neutralize the acidic constituents. Because of the large amounts of alkaline materials required for the neutralization, this too, is a costly operation. Various corrosion inhibitors such as formaldehyde, nitrogen bases of various types, amines, reaction products of amines and aldehydes, sulfonates and combinations of these agents have been used to inhibit corrosion in wells. While these corrosion inhibitors are satisfactory when used in wells which produce little water as compared to the oil produced, their cost becomes prohibitive when used in wells producing large amounts of water because in such wells large quantities of the inhibitor are required to maintain the required inhibitor concentration.

It is therefore a principal object of the present invention to provide a corrosion inhibitor composition which composition obviates the disadvantages of the prior art compositions. It is another object of my invention to provide a corrosion inhibitor composition for use in preventing corrosion of metals in oil producing apparatus which is caused by aqueous carbonic acid and/or water soluble aliphatic acids. It is a further object of this invention to provide an oil soluble corrosion inhibitor composition which may be economically used in oil wells producing large amounts of water. Yet another object of this invnetion is to provide an oil soluble corrosion inhibitor composition which is readily dispersible in water. Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, my invention comprises a method for inhibiting corrosion in oil wells where the corrosion is caused by aqueous carbonic acid by adding thereto a corrosion inhibitor composition comprising a polymerized high molecular weight carboxylic acid, a nonionic dispersing agent and a water soluble solvent for the polymerized high molecular weight carboxylic acid.

Before proceeding with specific examples illustrating this invention, it may be well to indicate in general the nature of the materials required in the process.

The polymerized high molecular weight carboxylic acids suitable in the process of this invention are obtained by polymerization of unsaturated acids in accordance with a method such as is described in the Journal of the American Oil Chemists Society 24, 65 (1947). Thus, raw materials containing linoleic acid on treatment by this method yield mixtures of dimers, trimers, and higher polymers of linoleic acid. Such a polymer mixture that may be utilized in the process of this invention is available commercially from Emery Industries, Inc., Cincinnati, Ohio, under the trade designation of M–461–$R_1$ Dimer Acids. It has the following properties:

Neutral equivalent _____ 290–310
Iodine value _____ 80–95
Dimer content _____percent ca__ 85
Trimer and higher _____do__ 12

Another suitable polymerized carboxylic is available under the trade designation of D–75 Dimer Acid. It has the following properties:

Iodine value _____ 42–55
Acid value _____ 156–170
Saponification value _____ 186–192
Unsaponifiable content _____percent__ 2–5

Another suitable polymerized acid is available under the trade designation of D–85 Dimer Acid. It has the following properties:

Acid value _____ 94–116
Iodine value _____ 44–50
Molecular weight _____ca__ 750

The D–75 and D–85 Dimer Acids are available commercially from the Harchem Division, Wallace & Tiernan, Inc., Belleville, New Jersey.

Suitable nonionic dispersing agents for the process of this invention are as follows:

| Type of Nonionic Compound | Prepared in Accordance with U.S. Patent |
|---|---|
| (1) Polyoxyalkylene ethers of fatty alcohols. | 1,970,578, Schoeller et al., August 21, 1934. |
|  | 2,425,755, Roberts, August 19, 1947. |
| (2) Polyoxyalkylene esters of fatty acids. | 1,970,578, 2,457,139, Fife et al., December 28, 1948. |
|  | 2,542,697, Devison et al., February 20, 1951. |
|  | 2,559,583, Barker, July 10, 1951. |
| (3) Polyoxyalkylene ethers of polyhydroxy alkyl esters of fatty acids | 2,422,486, Johnson, June 17, 1947. |
| (4) Polyoxyalkylene ethers of alkyl phenols. | 1,970,578, 2,085,706, Schoeller et al., June 29, 1937. |
|  | 2,522,447, Harris, September 12, 1950. |
| (5) Polyoxyalkylene ethers of alkyl naphthols. | 1,970,578, 2,085,706, |
| (6) Polyoxyalkylene thioethers of fatty mercaptans. | 2,522,446, Harris, September 12, 1950. |
|  | 2,565,986, Olin, September 28, 1951. |
| (7) Polyoxyalkylene derivatives of fatty acid amides. | 1,970,578, 2,085,706, 2,449,584, Barkey, July 10, 1951. |
| (8) Polyoxyalkylene derivatives of fatty acid alkylol amides. | 2,470,081, Thurston et al., May 10, 1949. |
| (9) Polyoxyalkyleno derivatives of amines. | 2,174,762, Schuette et al., October 3, 1939. |
| (10) Polyoxyalkylene imide derivatives of fatty acids. | 2,222,208, Ulrich, November 19, 1940. |
| (11) Polyoxyaylkylene derivatives of oxazolines. | 2,636,038, Brandner, April 21, 1953. |

Nonionic dispersing agents selected from the above list for use in the process of this invention are sold commercially under the trade designations Atlas G–1441, Atlas G–2079, Atlas G–2144, Atlas G–3720, Atlas G–3915, Atlas G–3920, Tweens 60, 65, 80, 85, and Brij 35, manufactured by the Atlas Powder Company.

Atlas G–1441 is a polyoxyethylene sorbitol lanolin derivative.

Atlas G–2079 is a polyoxyethylene mono-palmitate having a general formula:

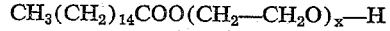

$$CH_3(CH_2)_{14}COO(CH_2\text{—}CH_2O)_x\text{—}H$$

where $x$=about 20.

Atlas G-2144 is a polyoxyethylene mono-oleate having a general formula:

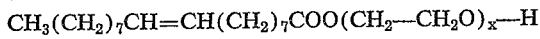

where $x$=about 20.

Atlas G-3720 is a polyoxyethylene mono-stearyl ether having a general formula:

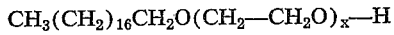

where $x$=about 20.

Atlas G-3915 and Atlas G-3920 are polyoxyethylene mono-oleyl ethers having the general formula:

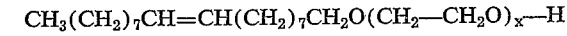

where $x$=about 19 and 20 respectively.

Tween 60 is a polyoxyethylene sorbitan monostearate having the general formula:

$$CH_3(CH_2)_{16}COO—C_6H_{10}O_4—(CH_2CH_2O)_xH$$

where $x$=about 15.5.

Tween 65 is a polyoxyethylene sorbitan tristearate having a general formula:

$$(CH_3(CH_2)_{16}COO)_3—C_6H_7O_4—(CH_2CH_2O)_xH$$

where $x$=about 18.

Tween 80 is a polyoxyethylene sorbitan monostearate having the general formula:

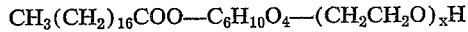

where $x$=about 16.

Tween 85 is a polyoxyethylene sorbitan trioleate having the general formula:

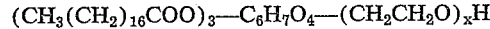

where $x$=about 20.

Brij 35 is a polyoxyethylene-lauryl alcohol condensation product formed by reacting ethylene oxide with lauryl alcohol.

Suitable solvents for the polymerized high molecular weight carbxylic acid must in addition be water soluble. Solvents which meet these requirements are as follows: low molecular weight aliphatic alcohols such as methanol, ethanol, n-propanol and isopropanol. In addition to the foregoing aliphatic alcohols, solvents such as acetone, methyl ethyl ketone, tetrahydrofurane, dioxane and mixtures of these solvents.

As to the amount of the different components making up my corrosion inhibitor composition, that may be varied over rather wide limits. For example, the quantity of the polymerized molecular weight carboxylic acid may vary from 15 to 80 parts; the dispersing agent from .5 to 15 parts; and the solvent from 84.5 to 5 parts. I prefer, however, to use these components in a somewhat narrower range, as for example, 50 to 75 parts of the polymerized high molecular weight carboxylic acid, 5 to 10 parts of the dispersing agent, and 45 to 15 parts of the solvent. In all cases where parts are specified, parts are by weight.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims. All parts are by weight.

EXAMPLE 1

The efficiencies of the various corrosion inhibitors were compared by determining the percent protection given a mild carbon steel test coupon subject to corrosion conditions in the presence of 50 parts of inhibitor composition per million parts of fluids by comparing the weight loss of a similar test coupon when subject to corrosion conditions in the absence of the inhibitor composition. A large-mouth bottle of about 250 ml. of capacity was charged with 150 ml. of Arbuckle brine and 50 ml. of kerosene containing the corrosion inhibitor composition being tested. The bottle was agitated to distribute the corrosion inhibitor between the two phases, a weighed 1-inch by 3-inch 10–20 mild carbon steel coupon inserted, then the bottle stopper fitted on. Carbon dioxide was bubbled through the solution at a rate of about 12 ml. per second. After 160 hours, the coupon was removed from the bottle, descaled by scrubbing with a nylon brush and a cleaning powder, weighed and its loss in weight determinde. The same technique was followed to obtain a blank in the absence of corrosion inhibitor composition. The percent protection was calculated as follows:

$$P.C.P. = \frac{(Wb_i - Wb_f) - (Wc_i - Wc_f)}{(Wb_i - Wb_f)} \times 100$$

where:
P.C.P.=Percent protection afforded by the inhibitor composition.
$Wb_i$=Initial weight of coupon subjected to test in the absence of inhibitor composition.
$Wb_f$=Final weight of coupon subjected to test in the absence of inhibitor composition.
$Wc_i$=Initial weight of coupon subjected to test in the presence of inhibitor composition.
$Wc_f$=Final weight of coupon subjected to test in the presence of inhibitor composition.

*Protection afforded by various inhibitor compositions*

[50 p.p.m. corrosion inhibiting composition in 3 parts of brine to 1 part of kerosene and a carbon dioxide environment for 160 hours]

| Experiment No. | Corrosion Inhibiting Composition ||||||  Percent Protection |
| --- | --- | --- | --- | --- | --- | --- | --- |
| | Corrosion Inhibitor | Parts Per 100 Parts of Composition | Dispersing Agent | Parts Per 100 Parts of Composition | Solvent | Parts Per 100 Parts of Composition | |
| 1 | D-85 | 75 | Tween 80 | 6 | Isopropanol | 20 | 99 |
| 2 | D-85 | 65 | Brij 35 | 5 | do | 30 | 90 |
| 3 | D-85 | 20 | Tween 80 | 2 | do | 78 | 65 |
| 4 | M-461-R | 65 | do | 5 | do | 30 | 89 |
| 5 | D-75 | 75 | do | 1 | do | 24 | 97 |
| 6 | D-75 | 50 | Tween 65 | 10 | do | 40 | 76 |
| 7 | D-85 | 70 | Tween 80 | 5 | Ethanol | 20 | 93 |
| 8 | D-85 | 70 | do | 5 | Acetone | 20 | 91 |
| 9 | D-85 | 70 | do | 5 | Tetrahydrofurane | 20 | 93 |
| 10 | M-461-R | 70 | Brij 35 | 5 | Methanol | 20 | 92 |

*Example 2*

A corrosion inhibitor composition of this invention was field tested in an oil well in the Driscoll Field of the Alice District of southern Texas. This well was producing an average of about 32 barrels of oil, 311 barrels of water, large quantities of carbon dioxide as indicated by the partial pressure of the carbon dioxide which varied from 0.5 to 5 atmospheres, and 1051 p.p.m. of water soluble aliphatic acids (acetic and propionic acids) per day. By means of a T-joint a 10–20 mild carbon steel test coupon could be inserted into the produced fluid flow. It was found that when no corrosion inhibitor was introduced into the well corrosion of a test coupon proceeded at a rate of 9.9 m.p.y. (mils per year) in tests carried out for a period of one month. When 3 quarts of a corrosion inhibitor containing as active ingredient the calcium salt of a high molecular weight alkyl aromatic hydrocarbon sulfonic acid were injected into the annular space of the well per day, it was found that corrosion proceeded at a rate of 7.3 m.p.y. When 4 quarts per day of a corrosion inhibitor composition in accordance with this invention consisting of 75% of a polymerized high molecular weight carboxylic acid (D–85), 5% of a polyoxyethylene sorbitan monostearate (Tween 80), and 20% of isopropanol were introduced into the annual space of the well, it was found that corrosion of the test coupon proceeded at a rate of only 0.55 m.p.y.

EXAMPLE 3

Another well in the Driscoll Field of the Alice District was field tested with various corrosion inhibitors. This well produced 8 barrels of oil, about 90 barrels of water, large quantities of carbon dioxide as indicated by the partial pressure of the carbon dioxide which varied from 0.5 to 5 atmospheres, and 963 p.p.m. of water soluble aliphatic acids per day. When tested over periods of one month, it was found that corrosion proceeded at a rate of 7.4 m.p.y. in the absence of corrosion inhibitor. When a corrosion inhibitor composition solution containing imidazoline was added to the annular space of the well in an amount equal to 4 quarts per day corrosion proceeded at a rate of .25 m.p.y. The imidazoline solution contained 35% active imidazoline. In another test 4 quarts of a solution containing 25% calcium postdodecyl-benzene sulfonate was added to the annular space of the well. Corrosion again proceeded at a rate equal to .25 m.p.y. The test was again then repeated with the exception that 3 quarts of the corrosion inhibitor composition of this invention as disclosed in Example 2 was introduced into the well twice weekly over a test period of one month. Corrosion in this case was reduced to a rate of .04 m.p.y.

While particular embodiments of the invention have been described it will be understood of course that the invention is not limited thereto since many modifications may be made; and it is, therefore, contemplated to cover by the appended claims any such modifications as fall within the true spirit and scope of the invention.

The invention having thus been described what is claimed and desired to be secured by Letters Patent is:

1. A corrosion inhibitor composition for gas and oil well equipment comprising from about 65 to about 75 parts of a dimer acid, from about 1 to about 10 parts of a nonionic dispersing agent and from about 34 to about 15 parts of a water soluble solvent for said dimer acid.

2. The corrosion inhibitor composition of claim 1 wherein the dimer acid is a dimer acid having a neutral equivalent of 290–310, an iodine value of 80–95, dimer content ca. 85 percent, and trimer and higher content ca. 12 percent.

3. The corrosion inhibitor composition of claim 1 wherein the dimer acid is a dimer acid having an iodine value of 42–55, acid value of 156–170, saponification value of 186–192, and unsaponifiable content of 2–5 percent.

4. The corrosion inhibitor composition of claim 1 wherein the dimer acid is a dimer acid having an acid value of 94–116, an iodine value of 44–50, and a molecular weight ca. 750.

5. The corrosion inhibitor composition of claim 1 wherein the nonionic dispersing agent is a polyoxyethylene sorbitan monostearate having the general formula:

$$(CH_3(CH_2)_7CH=CH(CH_2)_7COO)_3-C_6H_7O_4-(CH_2CH_2O)_xH$$

where $x$ = about 20.

6. The corrosion inhibitor composition of claim 1 wherein the nonionic dispersing agent is a polyoxyethylene sorbitan monostearate having the general formula:

$$(CH_3(CH_2)_{16}COO)_3-C_6H_7O_4-(CH_2CH_2O)_xH$$

where $x$ = about 18.

7. The corrosion inhibitor composition of claim 1 wherein the nonionic dispersing agent is a polyoxyethylene sorbitan monostearate having the general formula:

$$CH_3(CH_2)_7CH=CH(CH_2)_7COO-C_6H_{10}O_4-(CH_2CH_2O)_xH$$

where $x$ = about 16.

8. The corrosion inhibitor composition of claim 1 wherein the nonionic dispersing agent is a polyoxyethylene-lauryl alcohol condensation product formed by reacting ethylene oxide with lauryl alcohol.

9. The corrosion inhibitor composition of claim 1 wherein the water soluble solvent is isopropanol.

10. The corrosion inhibitor composition of claim 1 wherein the water soluble solvent is ethanol.

11. The corrosion inhibitor composition of claim 1 wherein the water soluble solvent is acetone.

12. The corrosion inhibitor composition of claim 1 wherein the water soluble solvent is methanol.

13. The corrosion inhibitor composition of claim 1 wherein the water soluble solvent is tetrahydrofurane.

References Cited in the file of this patent

UNITED STATES PATENTS

| | | |
|---|---|---|
| 2,564,759 | Haggard | Apr. 21, 1951 |
| 2,605,223 | Case | July 29, 1952 |
| 2,614,983 | Caldwell et al. | Oct. 21, 1952 |
| 2,632,695 | Landis et al. | Mar. 24, 1953 |
| 2,649,415 | Sundberg et al. | Aug. 18, 1953 |
| 2,763,612 | Raifsnider et al. | Sept. 18, 1956 |
| 2,814,593 | Beiswanger et al. | Nov. 26, 1957 |
| 2,839,465 | Jones | June 17, 1958 |